106. COMPOSITIONS, COATING OR PLASTIC.

Patented June 17, 1930

1,764,824

UNITED STATES PATENT OFFICE

HARRY E. BROOKBY AND GEORGE D. KING, OF CHICAGO, ILLINOIS, ASSIGNORS TO UNITED STATES GYPSUM COMPANY, OF CHICAGO, ILLINOIS, A CORPORATION OF ILLINOIS

CELLULAR STRUCTURAL MATERIAL

No Drawing. Application filed May 8, 1925. Serial No. 28,942.

This invention relates to building materials and more particularly to the production of a porous, cellular structural material.

It is an object of this invention to prepare a dry mixture including commercial calcined gypsum which when mixed with water to a plastic state will evolve a gas within the plastic mass causing it to expand to an increased volume and in that condition first congeal and then harden without settling.

In carrying out this invention a dry mixture comprising commercial gypsum, plaster of Paris, or its equivalent, including calcium sulphate in such state that hardening from plastic mixtures can be accomplished; a carbonate yielding an alkaline reaction on hydrolysis, and a metal salt giving in water solution an acid reaction which chemically react releasing the gas from the carbonate and precipitating a derivative in solid form is contemplated. When sufficient water is added to make this mixture fluid a multiplicity of gas bubbles or cells will be created within the mass by the evolution of the gas released by this reaction upon the interaction of the carbonate and metal salt, the metal of the salt being precipitated as a combined solid which will go into the interfaces of the gas bubbles system and the particles of the solid precipitate will film or embed themselves on the surface walls of the cellular structure increasing the viscosity or thickness of such walls and thereby retain the gas within the plastic mass while it is expanding until the entire mass congeals.

The volume of the plastic mass is extraordinarily increased by the evolution of the gas, and the bubbles are retained therein as the mass congeals, and finally hardens, through the setting of the calcined gypsum, to produce a firm, cellular structural material adapted to be formed into desired shapes when it is in the plastic state.

The hardening and setting of the calcined gypsum base proceeds normally as the finely divided particles of copper compound are precipitated from the solution and go into the interfaces of the gas bubble cells retaining the gas within the plastic mass, the copper compound also acting as an insoluble retarder. In this way the finely divided solid particles do not weaken the normal set gypsum structure as ordinary gypsum retarder does.

Saponaceous, mucilaginous, gummy, glutinous material substances giving a colloidal effect as well as commercial gypsum retarders have heretofore been employed to entrain the gas in plastic mixtures but such substances do not confine their influence or the gas evolution to the interfaces of the cellular structure about the gas bubble. Such substances mentioned are also soluble in water, will go into solution, and in solution will interfere with the normal setting of the gypsum base.

In accordance with this invention, this film strengthening agent is precipitated from one of the ingredients of the mixture when water is added and being insoluble by attaching itself to the interfaces of the actual film structure and through this reinforcement permits the plastic mass to retain its porous nature.

Insoluble film strengthening agents produce a much stronger structure than soluble substances such as above referred to, as the particles of the film strengthening agent go into the interfaces of the bubble or cellular structure, that is, attach themselves to the exterior of the gypsum wall structure between cells, and are found on the surfaces of these developed and hardened cell walls in the final hardened article when cut through for exposure. The calcined gypsum is not weakened and in hardening develops its full strength.

The mixture formed as a dry powder in accordance with this invention may be employed on the job, where it is handled by workmen, like any neat calcined gypsum material, for covering structures in place, or in a factory where cast units are made for subsequent erection in the field. As an example, a cubic foot of my porous material having a substantial structural value may be made from approximately thirty pounds of material having the following formula when mixed with water to a plastic state:

| | Parts |
|---|---|
| Calcined gypsum | 100 |
| Sodium carbonate | 2 |
| Copper sulphate | 10 |

In this mixture it is only necessary to add sufficient water which, when mixed therewith, will render the mixture fluid enough to cast or flow freely. The mass will expand many times the volume of the dry material without falling back or settling and the chemical reaction within the mass allows sufficient time for mixing, pouring, casting or working before congealing, hardening and setting upon or within the structure where it is employed.

This invention is not limited to the exact proportion or ingredients above specified for denser structures may be made by varying the proportion of the ingredients; also other ingredients will satisfactorily liberate gas and other metal salts will precipitate the copper compound on the interfaces of the gas bubble system and embed the particles thereof in the walls of the cells making up the cellular structure to prevent the mass from settling without departing from the spirit and scope of this invention.

In our prior pending application Serial No. 22,183, filed April 10, 1925, for a composition of matter, and of which this application is a continuation, the broad invention of producing a cellular or porous structural building material by mixing commercial gypsum; a carbonate yielding an alkaline reaction on hydrolysis; a substance, preferably a metal salt, giving an acid reaction in water solution and a finely divided insoluble solid, preferably powdered charcoal, carbon, graphite, talc, mica or finely divided silica which upon the addition of water will evolve a gas within and expand the plastic mass while the particles of the finely divided solid will go into the interfaces of the gas bubble system and film or imbed themselves on the surfaces of the walls of the cellular structure increasing the viscosity or thickness of such walls and thereby retaining until the entire mass congeals, hardens and sets, is fully set forth.

In this continuing application the finely divided solid, referred to in the prior application, is not added to the mixture as a separate ingredient. The finely divided solid is deposited upon the gas bubble cell wall in accordance with this invention by the chemical reaction between two of the ingredients of the mixture in the presence of water, while the gas is evolving, precipitating a copper compound thereon. The product resulting from this invention is on account of the nature of the finely divided solid, a much harder product than that specifically described in the said prior application.

What we claim is:

1. The process for producing a cellular structure which consists in adding sufficient water to a mixture of commercial calcined gypsum, sodium carbonate and copper sulphate to render the mass plastic and allow a chemical reaction between the carbonate and sulphate to liberate a gas within the plastic mass and precipitate a copper compound upon the interfaces of the gas cell walls, and then allowing the mass to dry.

2. The process of producing a cellular structure from calcined gypsum which consists in mixing together one hundred parts of commercial gypsum with two parts of sodium carbonate, ten parts of copper sulphate and adding sufficient water to make the mass plastic and cause a chemical reaction to take place therein evolving a gas and filming the surfaces of the gas bubble cell structure with an insoluble solid, and then allowing the mass to dry.

3. A cellular structural material derived from calcined gypsum, sodium carbonate, copper sulphate, and sufficient water to render the mixture fluid causing the sodium carbonate and copper sulphate to react to evolve a gas within the plastic mass and deposit a copper compound upon the walls of the gas bubble cells within the plastic mass.

4. A cellular structural material derived from substantially one hundred parts of calcined gypsum, two parts of sodium carbonate, ten parts of copper sulphate and sufficient water to render the mixture plastic causing the mass to expand and dry without settling.

5. A dry mixture comprising substantially one hundred parts of commercial gypsum, two parts of sodium carbonate and ten parts of copper sulphate, which substances upon the addition of water results in an expanded plastic cellular structure having the walls of the cells coated with a copper compound precipitated thereon during the evolution of a gas evolved by the reaction of the sodium carbonate and copper sulphate within the plastic gypsum which, without chemically reacting with the other ingredients to aid in evolving the gas, congeals and hardens without settling from the expanded state.

HARRY E. BROOKBY.
GEORGE D. KING.